US012670535B2

(12) United States Patent
Hord et al.

(10) Patent No.: US 12,670,535 B2
(45) Date of Patent: Jun. 30, 2026

(54) ADAPTIVE SKILL DEVELOPMENT AND ENHANCEMENT

(71) Applicant: Wells Fargo Bank, N.A., San Francisco, CA (US)

(72) Inventors: Matthew Tyler Hord, Stanley, NC (US); Anantharaman Kendapadi, Charlotte, NC (US); Rameshchandra Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 116 days.

(21) Appl. No.: 18/519,605

(22) Filed: Nov. 27, 2023

(65) Prior Publication Data

US 2025/0173806 A1 May 29, 2025

(51) Int. Cl.
| | |
|---|---|
| *G06Q 50/20* | (2012.01) |
| *G06Q 10/0631* | (2023.01) |
| *G06Q 10/0639* | (2023.01) |
| *G06Q 10/105* | (2023.01) |
| *G06Q 10/109* | (2023.01) |

(52) U.S. Cl.
CPC . *G06Q 50/2057* (2013.01); *G06Q 10/063112* (2013.01); *G06Q 10/06398* (2013.01); *G06Q 10/105* (2013.01); *G06Q 10/1097* (2013.01)

(58) Field of Classification Search
CPC ......... G06Q 10/06398; G06Q 10/0637; G06Q 10/063112; G06Q 50/2057; G06N 3/08; G06N 20/00
See application file for complete search history.

(56) References Cited

U.S. PATENT DOCUMENTS

| | | | | |
|---|---|---|---|---|
| 10,832,583 | B2 * | 11/2020 | Bouillet | G09B 5/12 |
| 2012/0078804 | A1 * | 3/2012 | Scarborough | G06Q 10/1053 |
| | | | | 705/321 |
| 2014/0186810 | A1 * | 7/2014 | Falash | G09B 5/06 |
| | | | | 434/308 |

(Continued)

FOREIGN PATENT DOCUMENTS

DE          202025100767 U1 *   3/2025   ....... G06Q 10/06398

OTHER PUBLICATIONS

Zahabi, M., Abdul Razak, A.M. Adaptive virtual reality-based training: a systematic literature review and framework. Virtual Reality 24, 725-752 (2020) (Year: 2020).*
Ka-Chun Siu, Bradley J. Best, Jong Wook Kim, Dmitry Oleynikov, Frank E. Ritter, Adaptive Virtual Reality Training to Optimize Military Medical Skills Acquisition and Retention, Military Medicine, vol. 181, Issue suppl_5, May 2016, pp. 214-220 (Year: 2016).*

(Continued)

*Primary Examiner* — Johnna R Loftis
(74) *Attorney, Agent, or Firm* — Merchant & Gould P.C.

(57) ABSTRACT

An adaptive skill development and enhancement system is presented for enhancing employee skills and competencies. Data encompassing an employee's skills, education, work history, performance, and aspirations are amassed. A machine learning algorithm analyzes the data, to establish an interpersonal affinity-behavioral matrix for use in identifying a skill gaps against a role-specific competency model. A customized learning experience, adapted to the employee's learning style as determined by the affinity-behavioral matrix, is generated and delivered through a user interface. The user interface collects feedback and performance metrics, which inform ongoing refinements to the learning content, ensuring continual alignment with the employee's development needs.

19 Claims, 4 Drawing Sheets

(56) References Cited

U.S. PATENT DOCUMENTS

| | | | |
|---|---|---|---|
| 2016/0232799 A1* | 8/2016 | Bartle | G09B 7/00 |
| 2016/0364994 A1* | 12/2016 | Leuchtmann | G06F 21/105 |
| 2019/0043380 A1* | 2/2019 | Clarke, IV | G09B 19/0053 |
| 2019/0333400 A1* | 10/2019 | Saini | G09B 7/00 |
| 2021/0056651 A1 | 2/2021 | Swamy et al. | |
| 2021/0264808 A1* | 8/2021 | Rudden | G16H 50/20 |
| 2022/0044583 A1* | 2/2022 | Sherman | G06F 16/2379 |
| 2022/0092514 A1* | 3/2022 | Guru | G06Q 10/1053 |
| 2022/0198368 A1* | 6/2022 | May | A63B 24/0003 |
| 2022/0292999 A1 | 9/2022 | Maher et al. | |
| 2022/0406207 A1 | 12/2022 | Celano et al. | |
| 2023/0039882 A1* | 2/2023 | Pappada | G06N 20/10 |
| 2023/0068203 A1 | 3/2023 | Yin | |
| 2023/0245067 A1* | 8/2023 | Baker | G06Q 10/063112 705/321 |
| 2023/0343236 A1* | 10/2023 | Gagnon | G09B 5/06 |
| 2024/0110806 A1* | 4/2024 | Bahnsen | G01C 21/3602 |
| 2024/0330834 A1* | 10/2024 | Tiwari | G06Q 10/063118 |
| 2025/0086556 A1* | 3/2025 | Lin | G06F 40/20 |

OTHER PUBLICATIONS

Donevska-Todorova, Ana, Katrin Dziergwa, and Katharina Simbeck. "Individualizing Learning Pathways with Adaptive Learning Strategies: Design, Implementation and Scale." CSEDU (2). 2022. (Year: 2022).*

Bendahmane, Mohamed; Brahim El Falaki; Benattou, Mohammed. Toward a Personalized Learning Path through a Services-Oriented Approach. International Journal of Emerging Technologies in Learning (Online); Vienna vol. 14, Iss. 15, (2019): 52-66. DOI:10.3991/ijet.v14i15.10951 (Year: 2019).*

S. Rahayu and T. A. Bablu, "Al-Augmented Learning and Development Platforms: Transforming Employee Training and Skill Enhancement", Journal of Computing Innovations and Applications, vol. 1, No. 01, pp. 19-38, Jan. 2023, (Year: 2023).*

Osadchyi, Viacheslav and Chemerys, Hanna and Osadcha, Kateryna and Kruhlyk, V. S. and Koniukhov, Serhii and Kiv, Arnold (2020) Conceptual model of learning based on the combined capabilities of augmented and virtual reality technologies with adaptive learning systems. CEUR Workshop Proceedings, 2731. (Year: 2020).*

* cited by examiner

ADAPTIVE SKILL DEVELOPMENT AND ENHANCEMENT

BACKGROUND

In the field of organizational psychology, employee interactions within a business environment are fundamentally categorized into three domains: the work, the worker, and the workplace. To fulfill their roles effectively, employees must possess requisite skills, knowledge, competencies, and qualifications. However, career development is an ongoing process, where continuous learning and skill enhancement play pivotal roles in enabling employees to progress to more advanced stages of knowledge: foundational, developmental, and advanced. Performance levels are inherently tied to these stages, with proficiency in specific tasks being contingent upon an employee's current level of expertise. For instance, an employee with foundational knowledge in process mapping might excel in elementary tasks but may falter when faced with complex process optimization challenges.

SUMMARY

Embodiments of the disclosure are directed to a computer-implemented adaptive skill development and enhancement system for enhancing employee skills and competencies. The system involves receiving data concerning an employee's current skill set, education, work experience, performance metrics, learning preferences, and career goals. The data is analyzed using a machine learning algorithm to create an interpersonal affinity-behavioral matrix, identifying skill gaps or development opportunities per a predefined competency model. A personalized learning experience is then generated, conforming to the employee's preferred learning style as determined by the affinity-behavioral matrix. The learning experience is accessible via a user interface, which also gathers performance data and feedback for ongoing updates to the learning content.

In another aspect, the system includes receiving additional data from direct questionnaires, peer feedback, social media interactions, and usage of collaborative tools. The machine learning algorithm can employ techniques such as neural networks or decision trees to refine the interpersonal affinity-behavioral matrix. The algorithm can strategically match a current skill set of an employee to the required competencies, identifying precise areas for development.

Further embodiments of the disclosure incorporate the generation of multimedia content within the personalized learning experience, scheduling learning sessions through integration with digital calendars based on optimal times, and creating scenario-based tasks using generative AI. The learning content can be categorized according to foundational, developmental, or advanced levels within the competency model, ensuring alignment with the employee's stage of career development.

Additionally, the user interface can include a feedback mechanism, enabling employees to rate their learning experiences, facilitating the adjustment of future content to better meet their needs and preferences. Emphasizing the functionality of the platform, these aspects work in concert to create a dynamic, effective, and personalized learning ecosystem for employees.

The details of one or more techniques are set forth in the accompanying drawings and the description below. Other features, objects, and advantages of these techniques will be apparent from the description, drawings, and claims.

DETAILED DESCRIPTION

Figure 1:
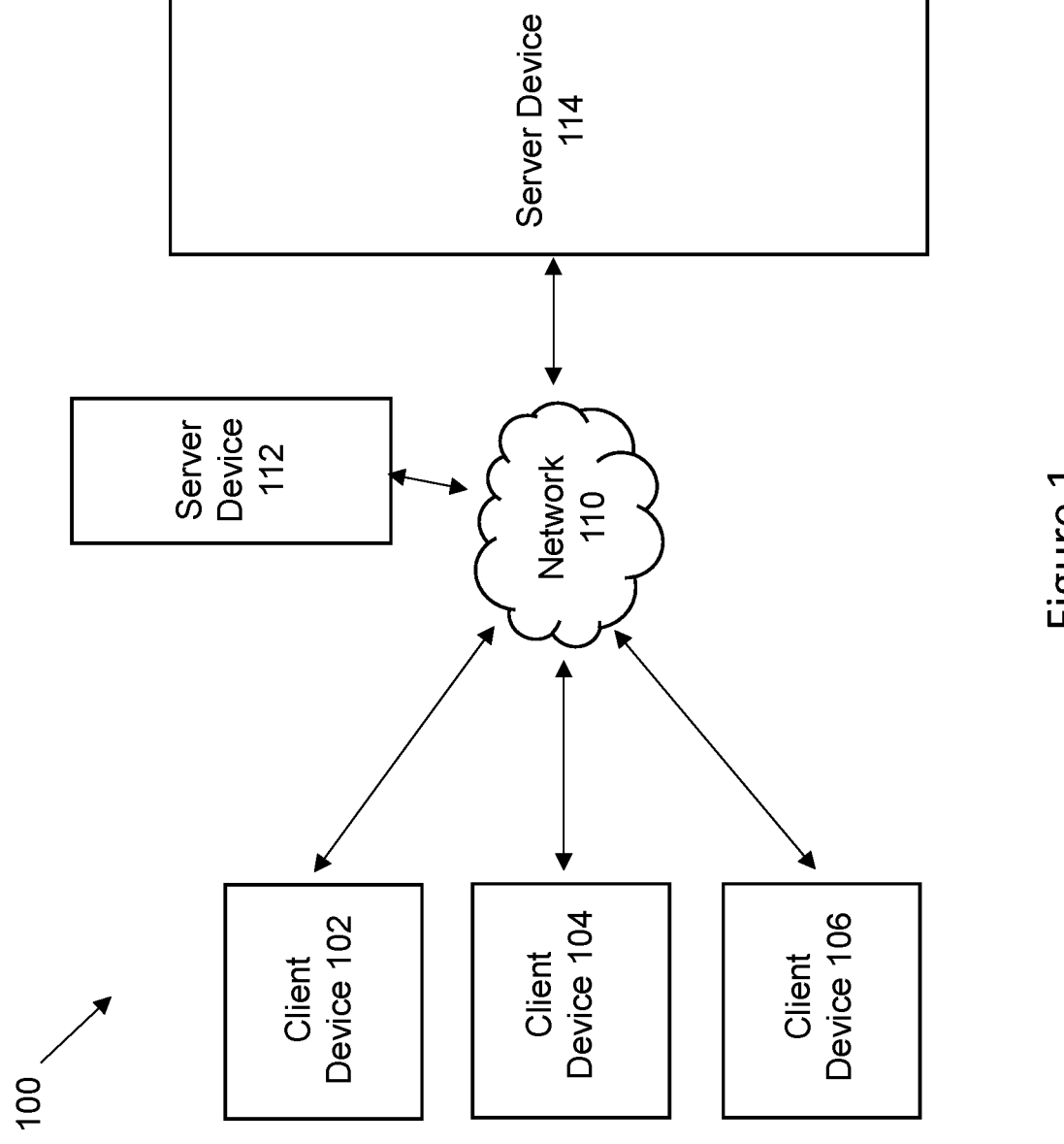
FIG. 1 shows an example an adaptive skill development and enhancement computer system for enhancing employee skills and competencies.

The present disclosure generally pertains to enhancing employee skills and competencies within an organizational context. Specifically, the disclosed adaptive skill development and enhancement computer system embodies an advanced technological framework designed to facilitate continuous learning and career development across varying levels of foundational, developmental, and advanced knowledge stages. This adaptive skill development and enhancement system is tailored to address and streamline the progression of employee expertise, promoting efficiency and efficacy in role-specific tasks through personalized learning experiences.

At its core, the adaptive skill development and enhancement system includes one or more processors and non-transitory computer-readable storage media. These components work in concert to execute encoded instructions that yield an operational method. Initially, the system is directed to collect employee-related data encompassing current skill sets, educational achievements, work experiences, performance metrics, learning preferences, and professional ambitions. In some embodiments, the data collection may be augmented through job satisfaction surveys, direct questionnaire responses, peer and managerial feedback, analysis of social media interactions, or insights from collaborative tools.

Subsequently, the collected data is analyzed by employing a machine learning (ML) algorithm to establish an interpersonal affinity-behavioral matrix. The interpersonal affinity-behavioral matrix is useful in tailoring a personalized adaptation of learning experiences. In some embodiments, the adaptive skill development and enhancement system can employ various ML techniques, such as neural networks, decision trees, support vector machines, or ensemble learning methods, to map out the skills gap or developmental opportunities relative to a predefined competency model tailored for an organizational role.

Further, the adaptive skill development and enhancement system can generate a customized learning journey that is congruent with the employee's learning style as determined by the interpersonal affinity-behavioral matrix. In some embodiments, the personalized learning experience can be enriched with a suite of multimedia content, including but not limited to interactive simulations, video tutorials, written materials, and quizzes, which can be geared towards addressing identified skills gaps.

The adaptive skill development and enhancement system boasts several intrinsic advantages that cater to modern organizational needs. Notably, the adaptive skill development and enhancement system can be engineered to integrate with an employee's digital calendar, intelligently scheduling learning sessions at opportune times to optimize engagement and retention. The adaptive skill development and enhancement system's architecture can leverage generative artificial intelligence (AI) to simulate scenario-based tasks that reflect real-world complexities, thus enhancing practical problem-solving skills.

In some embodiments, a user interface of the adaptive skill development and enhancement system can includes a feedback mechanism enabling iterative enhancement of the learning content based on user ratings and critiques. The iterative enhancement can embody principles of adaptive learning, ensuring the content remains dynamically aligned with the employee's evolving educational needs.

Moreover, the adaptive skill development and enhancement system encapsulates immersive technologies such as virtual reality to craft situational learning environments, reinforcing knowledge through experiential engagement. The adaptive skill development and enhancement system transcends traditional learning mechanisms by fostering an environment of psychological safety, promoting a judgment-free zone that stimulates the cerebral aspects of learning and enhances performance through critical engagement and stimulation.

Furthermore, the adaptive skill development and enhancement system aligns with the principles of peak performance science, expediting the journey to peak proficiency. By interlacing profiles that delineate the requisite skills and intersecting these with current competencies, the system curates interventions through "play" scenarios, thereby promoting a desire for repeated participation and consistent performance elevation.

The adaptive skill development and enhancement system introduces a technological innovation in the field of organizational psychology and employee development. The system utilizes advanced AI and ML algorithms to create personalized learning pathways, showcasing a non-generic and innovative approach to data processing. This system marks a technical advancement by specifically addressing and resolving inherent challenges in this domain.

The adaptive skill development and enhancement system elevates the efficiency of the learning process. The system is engineered with the capability to engage more effectively, incorporating functionalities that improve knowledge retention. Designed for flexibility, scalability, and responsiveness, the system adeptly meets the varied requirements of different organizational roles. This design aligns with and supports the broader objectives prevalent in business environments, demonstrating its enhanced adaptability and utility in a corporate context.

FIG. 1 provides a schematic diagram of an adaptive skill development and enhancement system 100 to facilitate the advancement of employee skills and competencies. The term "employee skills and competencies" refers to the range of abilities and knowledge that employees must possess and develop to perform effectively in their respective roles. While specific embodiments may highlight the application of the adaptive skill development and enhancement system 100 within the financial sector, the disclosed principles are versatile and can be adapted to diverse industry sectors and operational contexts.

Detailed in FIG. 1, the adaptive skill development and enhancement system 100 comprises a computing environment that includes client devices 102, 104, and 106. These client devices act as user interfaces within system 100 and connect to server devices 112 and 114 via network 110. Client devices 102, 104, and 106, which may be operated by employees for both learning and professional functions, are described as computing devices outfitted with at least one central processing unit (CPU), processor, and requisite memory storage to support the adaptive skill development and enhancement system's 100 functionality.

Server 114 is depicted as part of a server infrastructure, and can encompass a collection of servers or a cloud-based system. In certain embodiments, server 114 is utilized to compile and maintain a database of performance data and metrics pertinent to an employee's progress and usage of the adaptive skill development and enhancement system 100.

Server 112 represents an adaptive skill development and enhancement device within the adaptive skill development and enhancement system 100. In some embodiments, server 112 can be tasked with managing a flow of information between client devices 102, 104, and 106 and server 114. This flow can include interactions relevant to the personalization and delivery of learning experiences aimed at bolstering employee skills and competencies.

In some embodiments, server 112 can be equipped to execute a suite of processes that are integral to the adaptive skill development and enhancement system's 100 methodology, including collecting data related to an employee's skillset, processing the data through machine learning algorithms to identify skill gaps, and generating tailored learning experiences to address the gaps, thereby promoting the professional development of the workforce.

Figure 2:
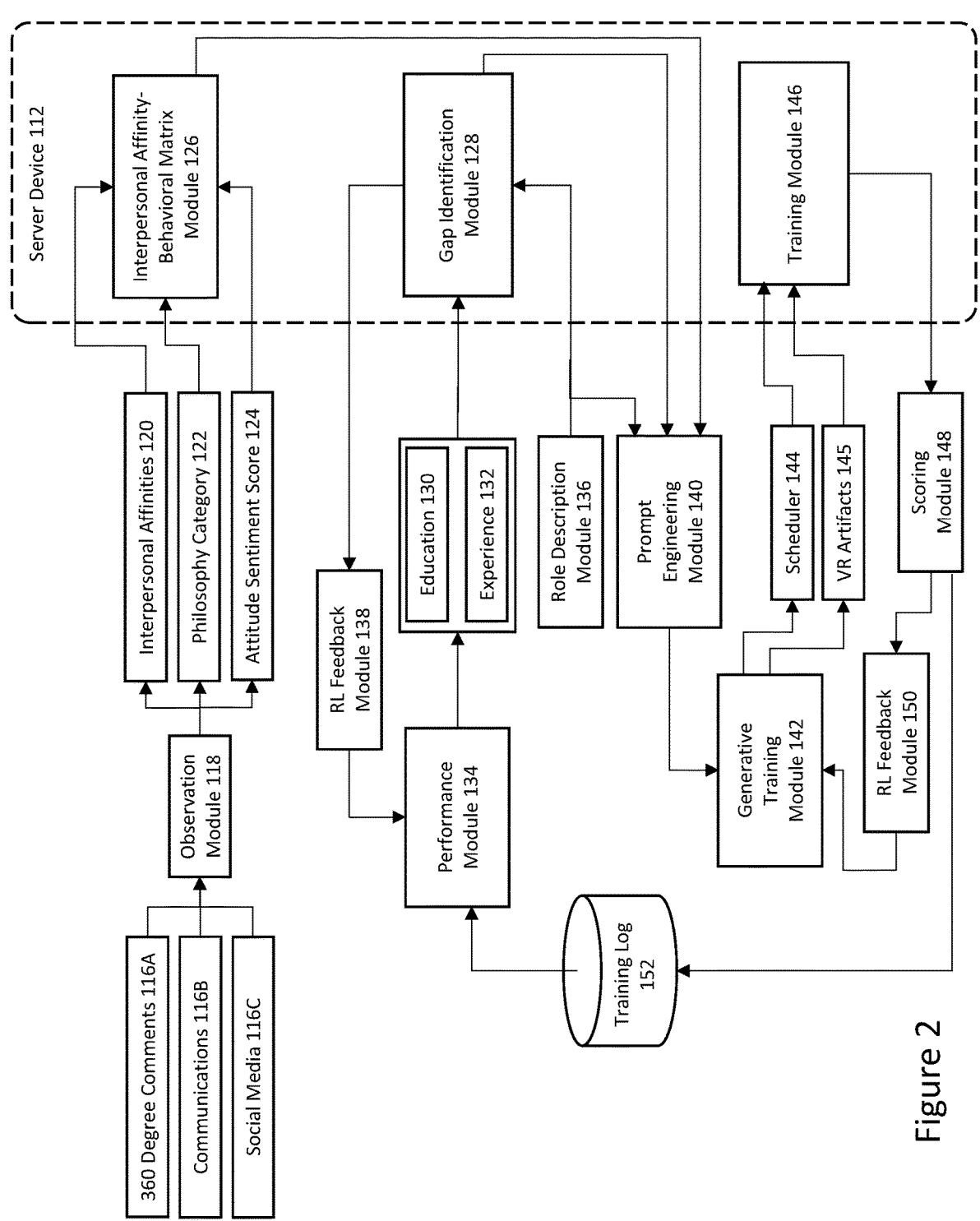
FIG. 2 shows example logical components of the adaptive skill development and enhancement computer system of FIG. 1.

Referring to FIG. 2, example logical components of the adaptive skill development and enhancement system 100 are depicted in accordance with an embodiment of the disclosure. Collectively, the logical components function to systematically collect, process, and analyze employee-related data to dynamically create personalized learning paths. These paths are designed to target identified skills gaps and developmental needs, aligning with individual career aspirations and the strategic objectives of the organization.

The logical components include data collection modules, machine learning processors, content generation engines, user interface applications, and feedback analysis tools. Together, the logical components facilitate a continuous cycle of learning, application, and assessment, thereby establishing a responsive and evolving platform for employee development and competency enhancement, ensuring that learning experiences are not only tailored to individual preferences and learning styles but are also consistently calibrated against performance metrics to drive measurable growth in employee capabilities.

In certain embodiments, the adaptive skill development and enhancement system 100 is equipped with a variety of specialized modules each serving a distinct function in the data acquisition process. For example, in one embodiment, the adaptive skill development and enhancement system 100 can include a 360-degree comments module 116A configured to solicit and compile feedback from a full range of sources that interact with the employee, including but is not limited to supervisors, subordinates, and peers within the organization, as well as self-assessment data provided by the employees themselves. The data collected by 360-degree comments module 116A can encompass qualitative and quantitative feedback on the employee's performance, skill proficiencies, and workplace behaviors, all of which contribute to a multi-faceted view of the employee's competencies.

A communications module 116B can be configured to gather data from various forms of employee communications, including email exchanges, instant messaging logs, collaboration tool interactions, and any other digital communication mediums utilized in the professional setting. The communications module 116B can analyze the content and patterns within these communications to extract insights into the employee's collaboration and communication skills, responsiveness, and overall engagement with their work environment.

Additionally, a social media module 116C can be integrated into the adaptive skill development and enhancement system 100 for the purpose of analyzing the employee's presence and activity on social media platforms. The social media module 116C can evaluate publicly available data, including posts, shares, likes, and network interactions, to infer the employee's interests, expertise areas, and influence within and potentially beyond the professional domain.

Each module 116A, 116B, and 116C can be configured to parse and curate data that provides insights into various aspects of an employee's professional profile, including the employee's existing skill set, educational background, completed training programs, historical work experience, performance evaluations, preferred learning modalities, and expressed career goals. The system utilizes this data to inform the development of tailored learning experiences aimed at addressing the unique skill gaps and career development trajectories of individual employees. Although the adaptive skill development and enhancement system 100 is depicted with three modules 116A, 116B, and 116C, the use of a greater or lesser number of data gathering modules is also contemplated.

In some embodiments, an observation module 118 is configured to receive data transmitted from the 360-degree comments module 116A, the communications module 116B, and the social media module 116C. The observation module 118 is specifically tasked with the segregation and classification of the received data into discrete categories pertinent to employee assessment and development.

In particular, the observation module 118 can employ data parsing techniques to systematically organize the received information into categories such as 'interpersonal affinities,' 'philosophical alignment,' and 'attitudinal sentiment.' These categories are indicative of the employee's social interaction preferences, alignment with the company's core values and philosophies, and overall attitude reflected in their communications and behaviors, respectively.

Upon categorization, the data can be channeled to three specialized processing modules. The interpersonal affinity module 120 is responsible for analyzing data related to the employee's relational dynamics, networking strengths, collaboration tendencies, and preference for social interaction within the professional setting. The interpersonal affinity module 120 can utilize algorithms to identify patterns and suggest potential alignments or mismatches with team dynamics and company culture.

Concurrently, the philosophy category module 122 can focus on the philosophical aspect of the data. In particular, the philosophy category module 122 module can analyze the employee's expressed beliefs, values, and ethical standpoint as they align with the organization's philosophy. The philosophy category module 122 can assess the degree of congruence between the employee's personal values and the organization's core values, which can influence the employee's integration and progression within the company.

The attitude sentiment score module 124 can be tasked with quantifying the sentiment behind the employee's communications and behaviors. The attitude sentiment score module 124 can apply sentiment analysis algorithms to evaluate the positive, neutral, or negative tonality of the employee's interactions and feedback received. A resulting sentiment score can provide an empirical measure of the employee's overall attitude, which can be indicative of their morale, job satisfaction, and potential for advocacy or dissent within the company.

In some embodiments, an interpersonal affinity behavioral matrix module 126 is configured to receive and synthesize data outputs from the interpersonal affinity module 120, philosophy category module 122, and attitude sentiment score module 124. The matrix module 126 can be configured to integrate these distinct data streams to construct a comprehensive interpersonal affinity-behavioral matrix, characterizing the employee's professional and social dispositions within the organization.

The matrix module 126, which is depicted as residing within server device 112 can incorporate AI algorithms to perform a multifaceted analysis on the collated data. For example, in one embodiment, the AI algorithm can be configured to aggregate the qualitative and quantitative data received from modules 120, 122, and 124, including includes patterns of interpersonal relationships, philosophical alignments, and attitudinal sentiments associated with the respective employee.

In some embodiments, the AI algorithm can be configured for pattern recognition, employing machine learning techniques, such as clustering and association rule learning, the AI identifies recurring themes and correlations within the aggregated data. This pattern recognition process can serve as an aid in discerning the nuances of the employee's interactions and alignments.

In some embodiments, the AI algorithm can be configured for behavioral matrix formation, utilizing the identified patterns, the AI can synthesize a behavioral matrix forming a structured representation that maps the employee's relational dynamics, value congruence, and attitudinal dispositions onto a coherent framework. In some embodiments, the AI algorithm can apply predictive models to the behavioral matrix to forecast potential future behaviors, affinities, and sentiment trends of the employee. Such predictions can be leveraged to anticipate the employee's future development needs and cultural fit. In some embodiments, the AI algorithm can be configured to continuously refine the behavioral matrix based on new data and feedback, ensuring that the matrix remains an accurate and dynamic reflection of the employee's evolving professional profile.

Accordingly, the interpersonal affinity-behavioral matrix generated by interpersonal affinity behavioral matrix module 126 serves as a tool for the adaptive skill development and enhancement system 100, by providing a nuanced understanding of the employee's professional persona, which can be leveraged to tailor personal development programs, enhance team compositions, and inform leadership about potential future leaders and influencers within the company.

As further depicted in FIG. 2, a gap identification module 128 can be configured to process and analyze data inputs from one or more contributory modules, for example including an education module 130, experience module 132, and performance module 134. Each of these modules 130, 132 and 134 can be responsible for collecting and processing specific categories of employee-related data.

In some embodiments, the education module 130 is tasked with the collection and analysis of data concerning the formal education, certifications, training programs, and workshops that an employee has completed. The education module 130 can assess the relevancy, currency, and level of education against the standards and requirements of the employee's current or potential future roles within the organization. Here, the term "currency" refers to the timeliness and up-to-date nature of the education and training, ensuring that the skills and knowledge gained are still relevant and applicable in the current job market and industry trends.

The experience module 132 can gather comprehensive data on the employee's professional history, including previous job roles, projects undertaken, durations of engagements, and the nature of tasks performed. In some embodiments, the experience module 132 evaluates the depth and breadth of the practical skills and knowledge the employee has accrued over time in a professional capacity.

The performance module 134 can compile data related to the employee's work performance within the organization. In some embodiments, this includes but is not limited to performance review scores, achievement of objectives, feedback from supervisors, peer reviews, and self-assessments. The performance module 134 quantifies and qualifies the effectiveness and efficiency with which the employee applies their skills and knowledge in their designated role.

The gap identification module 128 utilizes an algorithm to integrate the data procured from modules 130, 132, and 134, to allow for analysis of the employee's educational background, professional experience, and performance results. Concurrently, the identification module 128 accesses data from the role description module 136, which contains detailed descriptions of roles within the organization, including requisite skills, knowledge areas, competencies, and qualifications necessary for effective performance in each role.

By cross-referencing the aggregated data against the criteria set forth in the role description module 136, the gap identification module 128 employs comparative analysis to discern discrepancies between the employee's current capabilities and the competencies required for their role. This process enables the identification module 128 to pinpoint specific areas where the employee's profile falls short of the role's requirements (skills gap) or where there is potential for further development that aligns with the employee's career trajectory (development opportunity). These identified skills gaps and development opportunities are useful in informing personalized training programs, career development plans, and assisting human resources in strategic workforce planning, and can serve as the foundation for targeted interventions designed to enhance employee competencies and align individual growth with organizational objectives.

In some embodiments, the gap identification module 128 can incorporate an AI algorithm to fulfill its function of identifying skills gaps or development opportunities for employees. For example, the AI algorithm within gap identification module 128 can be designed to execute a multistage analysis on the data ingested from the education module 130, the experience module 132, and the performance module 134, as well as from the role description module 136, which details the requirements of various organizational roles.

In some embodiments, the AI algorithm can be configured for data integration to systematically amalgamate the educational qualifications, professional experience, and performance metrics of an employee, forming a comprehensive data set. Additionally, the AI algorithm can be used for comparative analysis, in which the AI algorithm compares the current qualifications and performance levels of the employee against the predefined competencies and skill requirements outlined in the role description module 136. Through this comparison, the algorithm can identify discrepancies, which are indicative of skills gaps where the employee's profile does not meet the role requirements or development opportunities where the potential for growth or advancement is evident.

In some embodiments, the AI algorithm can iteratively improve its classification accuracy by learning from each assessment, thereby increasing the precision of gap detection over time. To enhance the capability of the AI algorithm, particularly in the classification of data from the performance module 134, a reinforcement learning (RL) feedback module, identified as 138, can be utilized. The RL feedback module 138 operates on the principles of reinforcement learning, which involves training the AI algorithm based on a system of rewards and penalties.

For example, in some embodiments, the gap identification module 128 can receive RL feedback module 138 receives historical and real-time performance data, classify the data according to the success or failure of the employee in meeting performance benchmarks, and apply this classification as input to the AI algorithm. When the gap identification module 128 correctly identifies a skills gap or development opportunity that aligns with actual performance outcomes, the RL feedback module 138 provides a positive reinforcement signal. Conversely, when a misalignment occurs between the gap identification module's 128 predictions and actual performance outcomes, a negative reinforcement signal can be issued. These reinforcement signals can be used to train the gap identification module 128, enabling the gap identification module 128 to learn from past outcomes and adjust its predictive models for enhanced accuracy in future classifications.

The employment of the RL feedback module 138 facilitates the continuous improvement of the AI algorithm within the gap identification module 128, thereby ensuring that the system 100 can become progressively more adept at identifying the nuanced and evolving developmental needs of the workforce, thereby enabling more targeted and effective employee skill enhancement interventions.

Within the structure of the adaptive skill development and enhancement system 100, a prompt engineering module 140, can be incorporated for the purpose of facilitating the creation of tailored prompts intended to be utilized by a generative training module 142, for the production of personalized learning experiences for employees. In embodiments, the prompt engineering module 140 can operate by collating and synthesizing information extracted from the interpersonal affinity behavioral matrix module 126, the gap identification module 128, and the role description module 136.

In some embodiments, operation of the prompt engineering module 140 can retrieve the interpersonal affinity-behavioral matrix which encompasses the individual employee's social and professional interaction profiles, the identified skills gaps or development opportunities from the gap identification module, and the specific competencies and skill requirements associated with the employee's current or prospective roles from the role description module. Utilizing this amalgamated data, the prompt engineering module 140 can formulate structured input prompts, crafted to encapsulate the nuances of the required learning outcomes, tailored to bridge the identified skills gaps or to leverage the development opportunities pertinent to the employee.

To provide improved input quality to the generative training module 142, the prompt engineering module 140 can employ algorithms to optimize the prompts for specificity, relevance, and actionability, based on the comprehensive data set, ensuring that the prompts are directly aligned with individual learning needs and organizational objectives. For example, in some embodiments, the generative training module 142 can integrate a feedback mechanism to iteratively refine the prompts, enhancing their effectiveness over time based on the employee's engagement and progress with the generated learning content.

The generative training module 142, upon receiving the optimized prompts from the prompt engineering module 140, employs advanced generative algorithms to create customized learning experiences. These experiences may include interactive simulations, scenario-based training, and other educational content formats that are responsive to the prompts provided.

In some embodiments, a scheduler module 144 and a virtual reality (VR) artifacts module 145 are further employed to refine and orchestrate the timing of the delivery of customized learning experiences generated by the generative training module 142.

For example, in some embodiments, the scheduler module 144 can be loaded with algorithms capable of determining optimal learning schedules for employees, which can be based on an array of factors, including but not limited to, employee availability, historical engagement data indicating when the employee is most receptive to learning, as well as the urgency of skills gap closure as identified by the gap identification module 128.

In some embodiments, the scheduler module 144 can analyze the employee's work calendar, preferred learning times, and cognitive load to pinpoint the most effective time slots for learning engagement. The scheduler module 144 can sequence the learning experiences in a manner that aligns with the employee's personalized learning path, ensuring a logical progression of complexity and difficulty. Additionally, the scheduler module 144 can adjust the learning schedule in response to changes in the employee's availability or shifts in learning priorities, maintaining a flexible yet structured approach to skills development.

The VR artifacts module 145 can be responsible for the curation and integration of VR content into the learning experiences. The VR artifacts can be digital objects or environments specifically designed to simulate real-world scenarios relevant to the skills and competencies being developed.

In some embodiments, the VR artifacts module 145 can create customized content to match the specific learning objectives outlined in the personalized learning experiences, thereby enhancing the realism and applicability of the training. The VR artefacts module can enhance the interactivity of the VR artifacts, enabling employees to practice skills in a controlled, immersive environment that closely mirrors actual job conditions. Additionally, the VR artifacts module 145 can integrate the VR artifacts seamlessly with other multimedia content within the learning modules, providing a comprehensive and varied learning experience.

A training module 146 can be equipped with the capability to provide a user interface, which may serve as the primary interactive platform through which the employee engages with the personalized learning experience generated by the generative training module 142. For example, the training module 146 can facilitate interaction thread presentation layer configured to display the customized learning content, including interactive elements and multimedia resources, in a coherent and user-friendly format.

An input reception layer of the training module 146 can be configured to receive inputs from the employee, such as selections, responses to prompts, and completion of tasks. These inputs can be useful in tracking progression through the learning materials and for providing real-time data on the employee's engagement and comprehension. In some embodiments, the training module 146 can provide immediate feedback based on the employee's interactions for reinforcing learning concepts and guiding the employee through the learning experience.

In some embodiments, the user interface of the training module 146 can be designed to adapt the presentation of learning content dynamically based on the employee's input, performance, and preferences to ensure ensures that the learning experience remains aligned with the employee's pace and style of learning. Additionally, the user interface can incorporate functionality to track and record the employee's progress throughout the learning experience.

Additionally, the user interface of the training module 146 can provide intuitive navigation controls, allowing the employee to easily traverse the learning content, access additional resources, and control the pace of their learning experience. The training module 146 can ensure that the user interface complies with accessibility standards, making the learning experience inclusive for all employees regardless of disability.

Although the training module 146 is depicted as a component of the server device 112, the user interface can be integrated with other system modules, such as the VR artifacts module 145 and the scheduler module 144, to provide a seamless and immersive learning experience. Through these features, the training module 146 ensures that the employee is provided with an interactive and engaging platform for learning, designed to facilitate the effective and efficient acquisition of new skills and knowledge.

In some embodiments, a scoring module 148 can be incorporated to evaluate and quantify an employee's performance upon completion of a personalized learning experience. The scoring module 148 can be responsible for assessing the employee's engagement with the learning content, their understanding of the material, and their proficiency in executing the skills or knowledge being taught.

The scoring module 148 can operate by implementing a series of evaluative algorithms that are designed to, for example, automatically score the employee's responses and interactions within the learning experience, including but is not limited to, correct answers to quizzes, successful completion of simulations, and effective execution of tasks within virtual reality environments. In some embodiments, the scoring module 148 can assign quantitative metrics to various aspects of the employee's performance, which may encompass accuracy, timeliness, decision-making, and application of skills. Additionally, the scoring module 148 can compile these metrics into an aggregate score that reflects the overall performance of the employee in the learning experience. Thereafter, the scoring module 148 can compare the aggregate score against predefined benchmarks or expected performance levels to determine the employee's competency level in specific areas.

Upon the completion of the scoring process, data from the scoring module 148 can be transmitted to and stored within a training log 152, which can serve as a repository for historical performance data. Thereafter, the training log 152 can securely retain detailed records of all scores and relevant performance metrics associated with the employee's learning experiences. The training log 152 can provide accessible data for review and analysis by other system modules or by authorized personnel within the organization. The training log 152 can track the employee's progression and development over time, offering insights into the efficacy of the learning experiences and identifying trends in the employee's learning curve.

In some embodiments, data retained in the training log 152 can be subsequently utilized by the performance module 134, which provides data to the gap identification module 128. Thereafter, the performance module 134 can utilize the scored data to inform the ongoing analysis of the employee's skills gaps or development opportunities, ensuring that the identification of such gaps is grounded in empirical performance data, provide feedback that can be used to refine future learning experiences, ensuring they are more effectively tailored to the employee's specific developmental needs and adjust the personalized learning pathways for the employee based on their demonstrated performance, optimizing the learning experiences for better outcomes. Through the integration of the scoring module 148 and the training log 152 with the performance module 134, system 100 ensures a closed-loop feedback mechanism that continuously enhances the personalization and effectiveness of employee training programs.

A reinforcement learning (RL) feedback module 150 can be employed to enhance the efficacy of the outputs produced by the generative training module 142. For example, in one embodiment, RL feedback module 150 can utilize reinforcement learning techniques-a subset of machine learning where an algorithm learns to make decisions by performing actions in an environment that result in rewards or penalties.

In some embodiments, RL feedback module 150 can collaborate and assigns rewards or penalties based on the effectiveness of the learning experiences generated by the generative training module 152. These rewards or penalties are contingent upon metrics such as user engagement levels, learning outcomes achieved, and feedback received from users. The RL feedback module 150 can iteratively adjust the decision-making process of the generative training module 152. By processing the reward or penalty signals, the RL feedback module 152 can refine its algorithms to generate more effective learning experiences over time.

In some embodiments, the RL feedback module 150 can optimize the content generation outputs of the generative training module 152, ensuring that the learning experiences are increasingly aligned with the desired learning objectives and user preferences. For example, in one embodiment, the RL feedback module 150 can interface with the prompt engineering module 140 to fine-tune the learning content creation process. This interface operates as follows:

For example, the RL feedback module 150 can provide the prompt engineering module 140 with data reflecting the success or failure of previous learning prompts generated by module 140 and utilized by module 152. Leveraging this data, the prompt engineering module 140 can adjust its parameters for prompt creation, which can be aimed at enhancing the relevance and specificity of the prompts based on actual user interactions and learning performance outcomes. The adjusted prompts can then be fed into the generative training module 152, where they can be used to produce new iterations of learning experiences. This closed-loop feedback system enables continuous improvement of the learning content based on empirical data.

Through this collaborative process between the RL feedback module 150 and the prompt engineering module 140, the generative training module 152 becomes more adept at producing personalized learning experiences that are tailored to the evolving needs of the user base, thereby improving the overall quality and impact of the training content generated within system 100.

Figure 3:
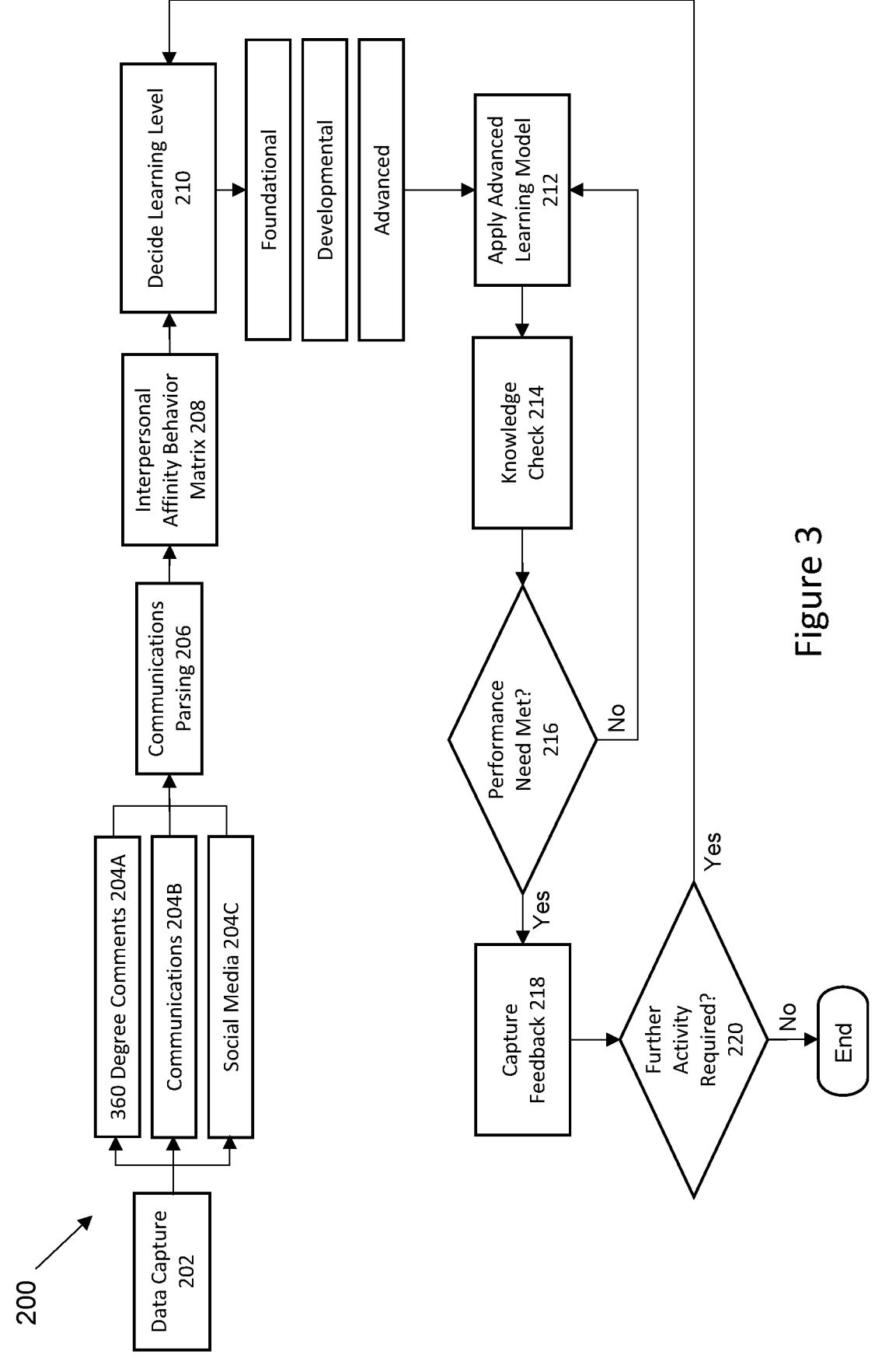
FIG. 3 shows a computer-implemented method for augmenting skills and competencies of employees, as executed by the adaptive skill development and enhancement computer system of FIG. 1.

In reference to FIG. 3, a detailed depiction is provided of a computer-implemented method, designated as method 200, which is purposed for augmenting the skills and competencies of employees within an organization, and executed by the adaptive skill development and enhancement system 100, as outlined in an embodiment consistent with the tenets of the disclosure.

Method 200 is depicted as comprising a series of structured steps, operationalized through system 100, designed to analyze, customize, and deliver educational content aimed at addressing the specific developmental needs of an employee. The method 200 is predicated on the integration and utilization of advanced computing processes, encompassing data collection, machine learning analysis, and the generation of personalized learning experiences. In this context, system 100 serves as the technological framework or platform that enables the execution of method 200's steps, providing the necessary hardware and software infrastructure to carry out the data processing, analysis, and content delivery outlined in method 200.

At operation 202, there exists a mechanism for continuous surveillance and evaluation of various facets of an employee's professional engagement within the organization, configured to monitor an array of data points that include, but are not limited to, skills requirements as outlined by the organization, formal performance reviews conducted periodically, and a spectrum of communications that transpire in the workplace. This comprehensive data collection endeavor enables system 100 to construct an exhaustive transcript that articulates and codifies aspects of the employee's persona, professional acumen, and workplace demeanor. In some embodiments, the data assimilated at operation 202 provides a multi-dimensional representation of the employee's professional identity and is pivotal for subsequent operations within the method.

Subsequent to the aggregation phase at operation 202, the data can undergo a segmentation process which can be facilitated through a set of operations. For example, at operation 204A, the data can be bifurcated to isolate 360-degree comments, which encompass feedback and evaluations from a variety of workplace sources including superiors, peers, subordinates, and self-assessment, which can be useful in painting a holistic picture of the employee's interpersonal skills, collaborative abilities, and self-awareness.

Operation 204B can further enable the segregation of general work communications, with a focus on capturing and analyzing data derived from day-to-day interactions, email exchanges, project communications, and other forms of workplace dialogue. The scrutiny of this data aims to extract insights regarding the employee's communicative proficiency, problem-solving approaches, and overall workplace engagement.

At operation 204C, system 100 can delineate data sourced from social media communications. This operation involves scrutinizing the employee's interactions on social media platforms which may provide supplementary context to the employee's professional network, influence, thought leadership, and extracurricular engagements that have bearing on their professional life.

While operations 204A, 204B, and 204C are specifically identified as data segmentation constructs, the employment of alternative or additional operational constructs for data categorization and analysis within system 100 is also contemplated. These constructs may be designed to capture and analyze data streams that are pertinent to the employee's professional development and organizational alignment, thereby enriching the employee persona transcript with multi-faceted, actionable insights.

At operation 206 there is a procedure for the analytical dissection of employee data designed to categorize and assess the employee data based on three primary dimensions: interpersonal affinities, philosophical categories, and attitude sentiment. Interpersonal affinities refer to the degree and nature of the employee's interactions and relationships within the workplace. The system analyzes data for patterns of engagement, collaborative tendencies, and the employee's network dynamics. Philosophical categories encompass the employee's alignment with organizational values, ethical standards, and cultural fit. Attitude sentiment analysis evaluates the tone, positivity or negativity, and emotional tenor of the employee's communications and feedback.

Following this tripartite analysis, at operation 208, system 100 proceeds to synthesize the analyzed data into an interpersonal affinity behavioral matrix. The interpersonal affinity behavioral matrix is a structured framework that encapsulates the nuances of the employee's professional interactions, value alignment, and emotional dispositions, and serves as a comprehensive profile that aids in understanding the employee's workplace persona and potential developmental trajectories.

In some embodiments, the development of the interpersonal affinity behavioral matrix incorporates methodologies derived from the Mental Measurements Yearbook (MMY). The MMY is a reference resource that presents standardized reviews of psychological assessment instruments, and its practices ensure that the matrix is constructed based on validated psychological metrics and assessment standards. The MMY's rigorous evaluation criteria are utilized to ensure that the instruments and methodologies employed in creating the matrix adhere to the highest standards of psychological testing.

This utilization includes, but is not limited to, selecting appropriate psychological tests, ensuring reliability and validity in the measurement of interpersonal, philosophical, and attitudinal constructs, and applying normative data where available. The employment of MMY practices in the creation of the interpersonal affinity behavioral matrix allows system 100 to maintain a robust, empirically sound approach to employee evaluation, ensuring that the resulting matrix is both accurate and meaningful in the context of human resource development and organizational psychology.

At operation 210, a process is engaged to ascertain an appropriate learning level for an employee. In some embodiments, the learning level can be selected by the employee. In other embodiments, a determination of the learning level can be an automated decision made by system 100, which categorizes the employee's current stage of expertise into one of three predefined levels: foundational, developmental, or advanced.

The foundational level can be characterized by an emphasis on basic knowledge and skills necessary for entry-level proficiency within a particular domain or job function. In some embodiments, the system 100 can identify employees at this stage by analyzing data indicative of a nascent or rudimentary understanding of concepts and procedures.

The developmental level represents an intermediary stage, where the focus is on building upon the foundational skills, aiming for a deeper understanding and greater competency. Employees classified at the developmental level are typically recognized by their pursuit of expanding their skill set beyond the basics, as evidenced by data showing engagement with more complex tasks and learning materials.

The advanced level pertains to employees who are refining and mastering their skill set, often specializing in certain areas or taking on leadership roles that require a high degree of expertise. System 100 identifies these individuals through data demonstrating a high level of proficiency, expertise, and often, the contribution of novel insights or innovations within their field.

In some embodiments, the system 100 can employ a combination of machine learning algorithms and predefined criteria to evaluate the employee's documented achievements, performance assessments, and ongoing learning engagements against the competency models stored within the system. Based on this evaluation, the system 100 can select or identify the learning level most representative of the employee's current status, as an aid in tailoring the subsequent personalized learning experience to be congruent with the employee's specific educational needs and career progression goals. The selected learning level then informs the customization of the learning content, ensuring that the complexity and depth of the material are suited to the employee's assessed stage of professional development.

At operation 212, an advanced learning model can be executed to conduct a dual-faceted analysis aimed at enhancing the professional aptitude of employees within an organizational structure. In embodiments, the advanced learning model can be an algorithmic component of system 100 configured to compare the current skill set and competencies of an employee against a predefined competency model that is specific to the employee's organizational role. Through this comparison, the model can discern deficiencies in skills (skills gaps) and potential areas for growth (development opportunities).

Additionally, the algorithm can utilize the data outputs from the interpersonal affinity-behavioral matrix, which provides insights into the employee's preferred methods of interaction and learning styles, to tailor the learning experiences to address the identified skills gaps or to capitalize on the development opportunities. The personalized learning content is formulated to align with the employee's unique learning preferences, thereby enhancing engagement and efficacy.

Subsequent to the generation of this tailored learning content, system 100 presents the personalized learning content through a user interface. In embodiments, the user interface can be a digital platform designed for the employee to engage with the personalized learning experience, thereby serving as a touchpoint that facilitates interaction with the educational material and allows for real-time inputs from the employee, thereby supporting active learning.

At operation 214, a process is instigated whereby the knowledge assimilated by the employee and their application of the learning experience are evaluated. This evaluation can involve a knowledge check to ascertain the employee's comprehension and acquisition of the skills or knowledge imparted through the learning experience. This assessment can take various forms, including but not limited to quizzes, simulations, practical tasks, or scenario analyses.

The results of the knowledge check can be scored and mapped against key performance indicators (KPIs) and success factors predetermined by the organization. These KPIs and success factors serve as benchmarks to gauge the effectiveness of the learning experience and the extent to which it has succeeded in bridging the identified skills gaps or enhancing the employee's capabilities.

At operation 216, a determination can be executed to evaluate whether the employee has achieved a desired performance level subsequent to engaging with the personalized learning experience. This determination can be facilitated by a performance assessment mechanism embedded within system 100, which can compare the employee's demonstrated capabilities against established performance criteria.

In some embodiments, the performance assessment mechanism can be configured to review the outputs of the learning validation scored at operation 214 to assess if the employee's performance aligns with the predefined success criteria, which may include mastery of certain skills, proficiency in job-specific tasks, or attainment of certain knowledge benchmarks. Based on this evaluation, a decision is made on whether the employee's performance meets the desired standards. If the employee's performance satisfies the predefined criteria, the process advances to operation 218.

At operation 218, system 100 can initiate a series of post-completion protocols. For example, the system 100 can log the personalized learning content as completed within the employee's training record, thereby capturing the date, duration, and nature of the completed learning experience. Additionally, the system 100 can prompt the employee to provide feedback on the personalized learning content and their overall training experience. This feedback can be collected via the user interface and can be used to refine the learning content and enhance the training experience for future iterations.

Alternatively, if the assessment at operation 216 indicates that the desired performance level has not been met, the process can revert to operation 212. At this juncture, the advanced learning model can be re-engaged to modify the personalized learning content, with the revision specifically targeting the areas where the employee's performance was deficient, as identified in the assessment. The revised content can then then presented to the employee, with an emphasis on the areas requiring additional review or practice. This approach ensures that learning interventions are targeted and responsive to the employee's needs.

This iterative process between operations 212, 216, and 218 embodies a feedback loop within system 100, ensuring that the employee's training journey is adaptive and outcome-focused. The system's ability to dynamically respond to the employee's performance levels guarantees that the learning content remains both relevant and effective in fostering professional development and competency enhancement.

At operation 220, an evaluative determination can be conducted to ascertain whether the employee requires further personalized learning content. In embodiments, the determination can be based on a comprehensive review of several factors, including but not limited to, the employee's performance outcomes, feedback provided on the completed learning content, and the progression towards achieving the predefined competencies and skills.

In some embodiments, the decision-making process at operation 220 can include analyzing the results of the employee's engagement with the learning content, including the performance metrics and validation scores obtained from operation 214. Additionally, the decision-making process can consider qualitative feedback from the employee regarding the learning experience, solicited at operation 218, to gauge their perception of the content's efficacy and their personal development progress. Additionally, the decision-making process can compare the current state of the employee's competencies with the desired competency model to determine residual gaps or potential areas for further skill enhancement.

Should the evaluative determination at operation 220 conclude that additional personalized learning content is indeed warranted, the process can be directed to revert to operation 210. At operation 210, the system 100 can reassess the employee's current learning level, which may include foundational, developmental, or advanced stages, to ensure that any additional content provided is suitably challenging and aligned with their current stage of professional growth. Thereafter, the system 100 can reinitiate the generation of personalized learning content, taking into account the latest performance data and employee feedback to address ongoing development needs.

Conversely, if the determination at operation 220 indicates that no further personalized learning content is necessary, the process can be deemed completed. If no further personalize learning content is desired, the system 100 can record the completion of the training cycle within the employee's training log, to confirm that the employee has met all the learning objectives and performance benchmarks. Thereafter, the employee's training records can be updated to reflect the successful completion of the learning experiences, and these records may be used for future reference or as a foundation for subsequent professional development initiatives. The decision-making protocol at operation 220 ensures that the learning trajectory of an employee within system 100 is both efficient and responsive to their continuous professional development needs.

In one implementation of the method 200, an employee (referred herein to as "Employee A") can employ the adaptive skill development and enhancement system 100 to enhance their skills and competencies. Initially, the method 200 can begin with profiling and initial assessment in which Employee A's employment designation, which is level P4, and associated role-specific data are ingested into system 100. This data encompasses their current operational competencies within foundational parameters, delineated responsibilities, and a performance history indicative of their proficiency in foundational-level tasks. Thereafter, the gap identification module within system 100 evaluates Employee A's current skill set against competency benchmarks requisite for advanced-level performance within their P4 designation, as differentiated across departments such as Human Resources (HR) and Wealth Investment Management (WIM).

The prompt engineering module subsequently derives specific prompts tailored to Employee A's identified skill deficits, particularly in the domain of decision-making. Based on the tailored prompts, the generative training module can construct one or more personalized learning interventions. These interventions are designed as interactive, scenario-based exercises that cater to elevating Employee A's decision-making abilities from a foundational to an advanced level.

The scheduler module can integrate employee A's availability, as determined by their digital calendar, to optimally time the delivery of the learning interventions. Additionally, the VR artifacts module can generate immersive simulations that emulate complex decision-making scenarios pertinent to Employee A's role.

Employee A's engagement with the personalized learning content can be quantitatively captured and analyzed by the scoring module, which can assign performance metrics to Employee A's responses and choices within the learning interventions. The RL feedback module can utilize the performance metrics to adapt the learning content dynamically, ensuring alignment with Employee A's learning progress and responsiveness.

Upon meeting the advanced-level performance criteria, the system 100 can log the intervention as completed and solicit evaluative feedback from Employee A regarding the efficacy and relevance of the learning content. Should the advanced-level performance criteria remain unmet, system 100 can reactivate the generative training module to recalibrate the learning interventions, focusing on areas identified for further development. The successful attainment of advanced-level competencies by Employee A is recorded within system 100, updating their professional development profile to reflect their elevated skill status.

Employee A is thus equipped with the requisite advanced competencies, positioning them for further professional advancement within the organizational structure. Through this implementation, method 200 via system 100 provides a structured and methodical approach to professional development, specifically catering to the individualized needs and career progression pathways of Employee A within the organization.

Figure 4:
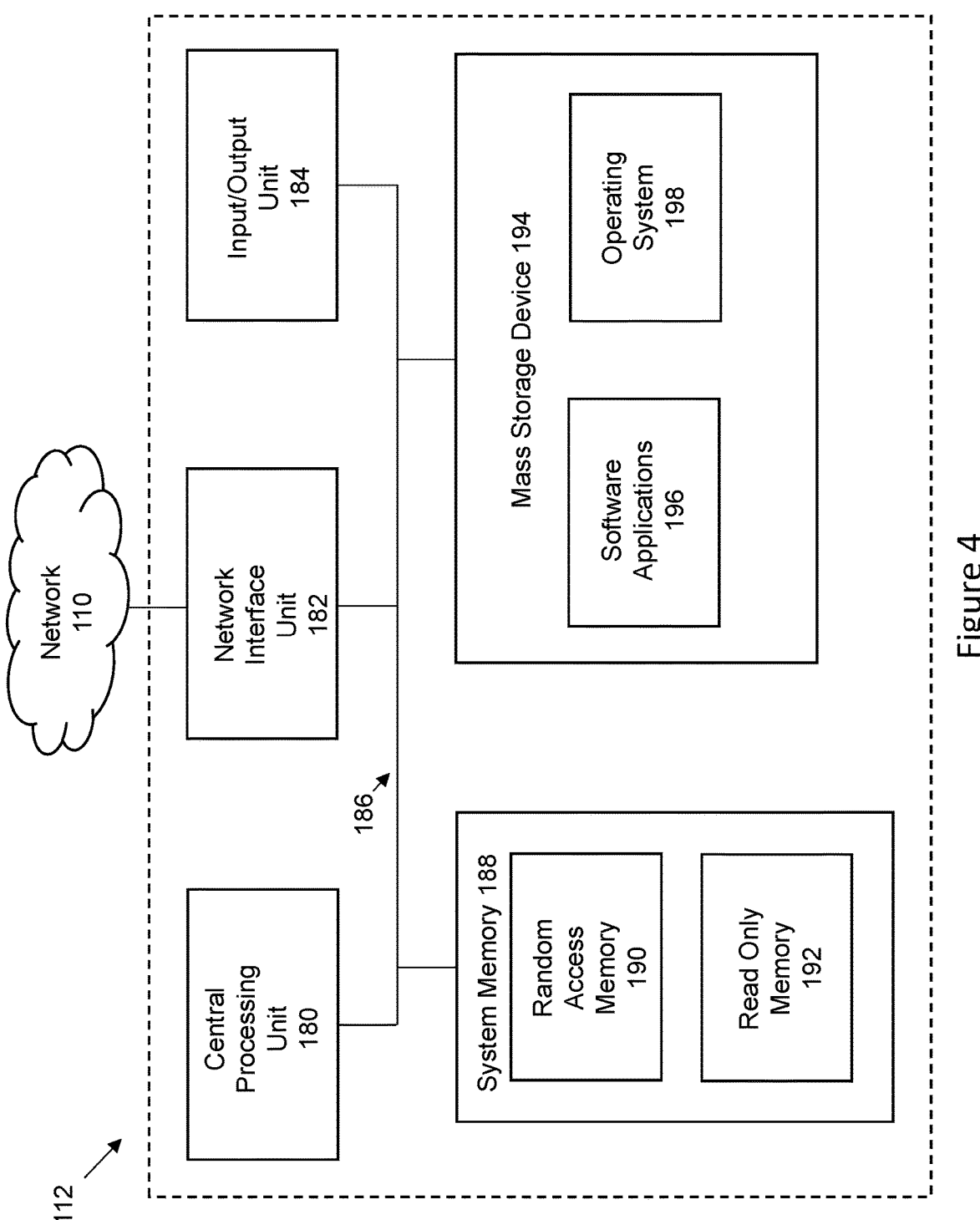
FIG. 4 shows example physical components of a server device of the adaptive skill development and enhancement computer system of FIG. 1.

As illustrated in the embodiment of FIG. 4, the example adaptive skill development and enhancement device (e.g., server 112), which provides the functionality described herein, can include at least one central processing unit ("CPU") 180, a system memory 188, and a system bus 186 that couples the system memory 188 to the CPU 180. The system memory 188 includes a random access memory ("RAM") 190 and a read-only memory ("ROM") 192. A basic input/output system containing the basic routines that help transfer information between elements within the adaptive skill development and enhancement device, such as during startup, is stored in the ROM 192. The adaptive skill development and enhancement device further includes a mass storage device 194. The mass storage device 194 can store software instructions and data. A central processing unit, system memory, and mass storage device similar to that shown can also be included in the other computing devices disclosed herein.

The mass storage device 194 is connected to the CPU 180 through a mass storage controller (not shown) connected to the system bus 186. The mass storage device 194 and its associated computer-readable data storage media provide non-volatile, non-transitory storage for the adaptive skill development and enhancement device. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the adaptive skill development and enhancement device.

According to various embodiments of the invention, the adaptive skill development and enhancement device may operate in a networked environment using logical connections to remote network devices through network 110, such as a wireless network, the Internet, or another type of network. The network 110 provides a wired and/or wireless connection. In some examples, the network 110 can be a local area network, a wide area network, the Internet, or a mixture thereof. Many different communication protocols can be used.

The adaptive skill development and enhancement device may connect to network 110 through a network interface unit 182 connected to the system bus 186. It should be appreciated that the network interface unit 182 may also be utilized to connect to other types of networks and remote computing systems. The adaptive skill development and enhancement device also includes an input/output controller 184 for receiving and processing input from a number of other devices, including a touch user interface display screen or another type of input device. Similarly, the input/output controller 184 may provide output to a touch user interface display screen or other output devices.

As mentioned briefly above, the mass storage device 194 and the RAM 190 of the adaptive skill development and enhancement device can store software instructions and data. The software instructions include an operating system 198 suitable for controlling the operation of the adaptive skill development and enhancement device. The mass storage device 194 and/or the RAM 190 also store software instructions and applications 196, that when executed by the CPU 180, cause the adaptive skill development and enhancement device to provide the functionality of the adaptive skill development and enhancement device discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer-implemented method for enhancing employee skills and competencies, comprising:

collecting data pertaining to at least one of a current skill set, completed education or training, work experience, performance metrics, learning styles, or career aspirations of an employee;

analyzing the data using a machine learning algorithm that is trained on historical performance data, wherein the machine learning algorithm is configured to identify recurring themes and correlations within the data using at least one of clustering or association rule learning techniques to establish an interpersonal affinity-behavioral matrix for the employee;

identifying at least one of a skills gap or a development opportunity relative to a predefined competency model for an organizational role;

generating a personalized learning experience based on the skills gap or the development opportunity, where the personalized learning experience conforms to a learning style adapted to the employee based on the interpersonal affinity-behavioral matrix;

creating virtual reality artifacts comprising digital environments simulating real-world scenarios relevant to the skills and competencies being developed, wherein the virtual reality artifacts are customized to mirror job conditions and enable the employee to practice the skills and competencies in a controlled immersive environment, wherein the machine learning algorithm dynamically configures complexity and interactivity levels of the virtual reality artifacts based on the interpersonal affinity-behavioral matrix and real-time performance data collected during the employee's interaction with the virtual reality artifacts;

providing a user interface through which the employee interacts with the personalized learning experience, wherein the user interface includes virtual reality components that integrate the virtual reality artifacts to create a comprehensive learning experience; and dynamically updating the personalized learning experience based on performance data and feedback collected through the user interface, including continuously:

modifying presentation of learning content based on input from the employee, the performance metrics, and preferences through the interpersonal affinity-behavioral matrix; and refining the interpersonal affinity-behavioral matrix based on updated performance data collected from both the virtual reality artifacts and other learning content to provide an accurate reflection of an evolving professional profile of the employee, wherein the interpersonal affinity-behavioral matrix is used to reconfigure the virtual reality artifacts in subsequent learning sessions;

wherein positive reinforcement signals are applied when identification of the skills gap aligns with actual performance outcomes and negative reinforcement signals are applied when misalignment occurs to train the machine learning algorithm for enhanced accuracy; and wherein the machine learning algorithm iteratively improves its classification accuracy by learning from each assessment to increase precision of the identification of the skills gap over time.

2. The method of claim 1, wherein the collecting of the data further includes obtaining input from at least one of direct responses to questionnaires, feedback from peers or managers, social media profiles and interactions, or collaborative tools used by the employee.

3. The method of claim 1, wherein the machine learning algorithm utilizes at least one of a neural network, decision tree, support vector machine, or ensemble learning method to establish the interpersonal affinity-behavioral matrix.

4. The method of claim 1, wherein the machine learning algorithm matches the current skill set with the predefined competency model for the organizational role to identify the skills gap.

5. The method of claim 1, wherein the personalized learning experience includes multimedia content comprising at least one of interactive simulations, video tutorials, written content, or quizzes.

6. The method of claim 1, further comprising integrating the personalized learning experience with a digital calendar of the employee to schedule a learning session according to one or more optimal times identified by the interpersonal affinity-behavioral matrix.

7. The method of claim 1, further comprising leveraging generative AI to create a scenario-based learning task that mimics a real-world problem.

8. The method of claim 1, wherein the personalized learning experience is adapted to an employment level of understanding categorized as foundational, developmental, or advanced within the predefined competency model for the organizational role.

9. The method of claim 1, wherein the user interface includes a feedback mechanism enabling the employee to rate the personalized learning experience.

10. The method of claim 9, wherein the feedback is used to adjust subsequent learning content.

11. A computer system for enhancing employee skills and competencies, comprising:

one or more processors; and non-transitory computer-readable storage media encoding instructions which, when executed by the one or more processors, cause the computer system to:

collect data pertaining to at least one of a current skill set, completed education or training, work experience, performance metrics, learning styles, or career aspirations of an employee;

analyze the data using a machine learning algorithm that is trained on historical performance data, wherein the machine learning algorithm is configured to identify recurring themes and correlations within the data using at least one of clustering or association rule learning techniques to establish an interpersonal affinity-behavioral matrix for the employee;

identify at least one of a skills gap or a development opportunity relative to a predefined competency model for an organizational role;

generate a personalized learning experience based on the skills gap or the development opportunity, wherein the personalized learning experience conforms to a learning style adapted to the employee based on the interpersonal affinity-behavioral matrix;

create virtual reality artifacts comprising digital environments simulating real-world scenarios relevant to the skills and competencies being developed, wherein the virtual reality artifacts are customized to mirror job conditions and enable the employee to practice the skills and competencies in a controlled immersive environment, wherein the machine learning algorithm dynamically configures complexity and interactivity levels of the virtual reality artifacts based on the interpersonal affinity-behavioral matrix and real-time performance data collected during the employee's interaction with the virtual reality artifacts;

provide a user interface through which the employee interacts with the personalized learning experience, wherein the user interface includes virtual reality components that integrate the virtual reality artifacts to create a comprehensive learning experience;

integrate the personalized learning experience with a digital calendar of the employee to schedule a learning session according to one or more optimal times identified by the interpersonal affinity-behavioral matrix; and dynamically update the personalized learning experience based on performance data and feedback collected through the user interface, including to continuously:

modify presentation of learning content based on input from the employee, the performance metrics, and preferences through the interpersonal affinity-behavioral matrix; and refine the interpersonal affinity-behavioral matrix based on updated performance data collected from both the virtual reality artifacts and other learning content to provide an accurate reflection of an evolving professional profile of the employee, wherein the interpersonal affinity-behavioral matrix is used to reconfigure the virtual reality artifacts in subsequent learning sessions;

wherein positive reinforcement signals are applied when identification of the skills gap aligns with actual performance outcomes and negative reinforcement signals are applied when misalignment occurs to train the machine learning algorithm for enhanced accuracy; and wherein the machine learning algorithm iteratively improves its classification accuracy by learning from each assessment to increase precision of the identification of the skills gap over time.

12. The computer system of claim 11, wherein the one or more processors are further configured to obtain additional data input from at least one of direct responses to questionnaires, feedback from peers or managers, social media profiles and interactions, or collaborative tools used by the employee.

13. The computer system of claim 11, wherein the machine learning algorithm executed by the one or more processors utilizes at least one of a neural network, decision tree, support vector machine, or ensemble learning method to establish the interpersonal affinity-behavioral matrix.

14. The computer system of claim 11, wherein the machine learning algorithm executed by the one or more processors matches the current skill set with the predefined competency model for the organizational role to identify the skills gap.

15. The computer system of claim 11, wherein the non-transitory computer-readable storage media further encodes instructions for providing multimedia content in the personalized learning experience, comprising at least one of interactive simulations, video tutorials, written content, or quizzes.

16. The computer system of claim 11, wherein the one or more processors are further configured to leverage generative AI to create a scenario-based learning task that mimics a real-world problem.

17. The computer system of claim 11, wherein the personalized learning experience is adapted by the one or more processors to an employment level of understanding categorized as foundational, developmental, or advanced within the predefined competency model for the organizational role.

18. The computer system of claim 11, wherein the user interface is configured to include a feedback mechanism enabling the employee to rate the personalized learning experience.

19. The computer system of claim 18, wherein the one or more processors are further configured to use the feedback to adjust subsequent learning content.

* * * * *